No. 716,015. Patented Dec. 16, 1902.
F. H. FARNHAM.
GAGE SHEARS.
(Application filed May 26, 1900. Renewed Apr. 24, 1902.)
(No Model.)
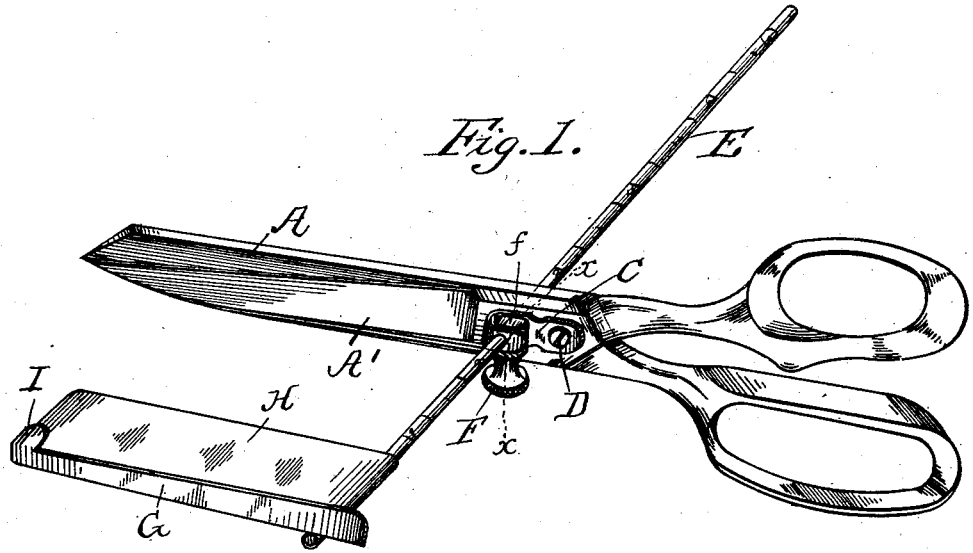
Fig. 1.
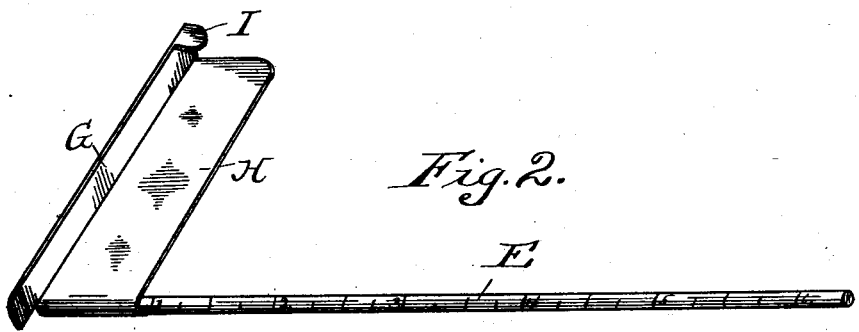
Fig. 2.
Fig. 3.
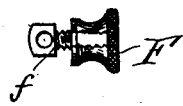
Fig. 4.
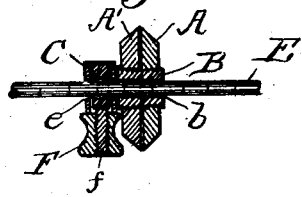
Fig. 5.
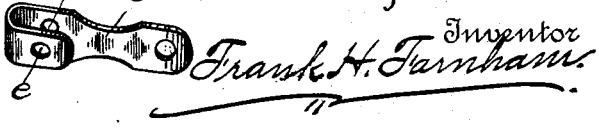
Witnesses.
Albert Popkins.
May M. Plyer.
Inventor
Frank H. Farnham.
THE NORRIS PETERS CO., PHOTO-LITHO., WASHINGTON, D. C.

UNITED STATES PATENT OFFICE.

FRANK H. FARNHAM, OF CINCINNATI, OHIO.

GAGE-SHEARS.

SPECIFICATION forming part of Letters Patent No. 716,015, dated December 16, 1902.

Application filed May 26, 1900. Renewed April 24, 1902. Serial No. 104,477. (No model.)

*To all whom it may concern:*

Be it known that I, FRANK H. FARNHAM, a citizen of the United States, residing at Cincinnati, in the county of Hamilton and State of Ohio, have invented certain new and useful Improvements in Gage-Shears; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in gage-shears, the objects in view being, first, to produce a simple, inexpensive, and durable attachment easily adjusted for the purpose designed; second, my improvement may be conveniently attached to any shear now in use and does not require a shear especially constructed; third, the gage-bar being attached at the pivotal point of the shears has the same motion as the shear-blade to which it is attached. By the use of these attachments the operator can cut the material in any width desired. I attain these objects by the mechanism illustrated in the accompanying drawings, in which—

Figure 1 is a perspective view of a pair of shears with my improved shear-gage attached thereto. Fig. 2 is a perspective view of my gage-bar detached. Fig. 3 is a side elevation of the thumb-nut with the adjusting-screw. Fig. 4 is a transverse sectional view on the line $x\ x$ of Fig. 1. Fig. 5 is a perspective view of the bracket through which the gage-bar passes.

Similar letters refer to similar parts throughout the several views.

An ordinary pair of shears A and A' is provided with a hollow rivet B, which is shown in section in Fig. 4, through which the adjustable gage-bar passes. On the side of the leg A' is secured a bracket C, which is secured to said leg A' by the screw D and has formed through it a hole or aperture $e$, which registers with the hole $b$ in the hollow rivet through which the gage-bar E is introduced and adjustably secured at any location by the thumb-nut F and the adjusting-screw $f$. The gage-bar E is provided at its end with an L-shaped sheet-metal gage G, the horizontal portion H forming a guide-plate, and the upper end of the vertical side of the sheet-metal gage G has formed thereon a lateral extension I, which serves for the purpose of keeping the material to be cut in a straight line.

This completes the construction of the device, whose operation is as follows: The edge or fold of the material to be cut is laid on the horizontal portion H of the angle gage-plate and is guided by the vertical side G and extension I of the gage-plate as the shears are thrust forward in cutting, and thus parallel strips of desired width may always be cut. In this manner bias strips of a uniform width may be produced with accuracy and facility.

Having described my invention, what I claim is—

1. The combination with a pair of shears, of a scale-bar mounted adjustably therein of the hollow rivet, the bracket provided with a hole registering with the hollow rivet, and the adjusting thumb nut and screw, substantially as described.

2. The combination with the legs or blades of the shears which are pivotally secured together by a hollow rivet, of a gage-bar mounted in said rivet and adjustable independently of the same, a bracket secured to one of the legs or blades to receive said gage-bar, and means engaging said bracket and bar for securing the latter in the adjusted position, substantially as described.

3. In combination, the shears having their legs or blades secured together by a hollow rivet, the bracket secured to one of said legs and provided with an aperture registering with the hollow rivet, the adjustable gage-bar mounted in said bracket and hollow rivet, and means for securing the bar in the adjusted position, substantially as described.

4. In combination, the shears having their legs or blades pivotally secured together by a hollow rivet, the bracket secured to one of said legs or blades and provided with an opening registering with the opening in the hollow rivet, the adjustable gage-bar mounted in said bracket and hollow rivet, the adjusting-screw carried by said bar, and the thumb-nut mounted on said screw for engagement with the bracket to secure the gage-bar in the adjusted position, substantially as described.

5. The combination with the shears having their legs or blades pivotally secured together by a hollow rivet, of a gage-bar mounted in the rivet and adjustable through the same, and means for securing the bar in the adjusted position, substantially as described.

6. The combination with the shears having their legs or blades pivotally secured together by a hollow rivet, of the gage-bar mounted in said hollow rivet and carrying a guide-plate at one end which is provided with a lateral extension, and means for securing the gage-bar in the adjusted position, substantially as described.

In testimony whereof I affix my signature in presence of two witnesses.

FRANK H. FARNHAM.

Witnesses:
H. L. COGSWELL,
EDWARD L. SNYDER.